United States Patent
Danielmeyer

[15] 3,697,888
[45] Oct. 10, 1972

[54] EVANESCENT WAVE COUPLING TECHNIQUE FOR BEAM SHAPING

[72] Inventor: Hans Guenter Danielmeyer, Matawan, N.J.

[73] Assignee: Bell Telephone Laboratories, Incorporated, Murray Hill, Berkeley Heights, N.J.

[22] Filed: June 1, 1971

[21] Appl. No.: 148,739

[52] U.S. Cl. ................................. 331/94.5, 350/96
[51] Int. Cl. .................................................. H01s 3/02
[58] Field of Search ............... 331/94.5; 350/96 WG; 356/106 LR

[56] References Cited

UNITED STATES PATENTS

| 3,408,131 | 10/1968 | Kapany | 350/96 WG |
| 3,476,463 | 11/1969 | Kreuzer | 331/94.5 |
| 3,584,230 | 6/1971 | Tien | 331/94.5 |
| 3,586,872 | 6/1971 | Tien | 350/96 WG |

*Primary Examiner*—William L. Sikes
*Attorney*—R. J. Guenther and Arthur J. Torsiglieri

[57] ABSTRACT

There is disclosed a coherent optical oscillator in which evanescent wave coupling between two surfaces, at least one of which is curved, provides beam shaping and improved overall conversion efficiency. In general, bicylindrical curvature is provided, for example, by appropriately oriented cylindrical curvatures of the two surfaces. There are specifically disclosed a second-harmonic generator having improved conversion efficiency and a thin-film laser having improved output characteristics.

8 Claims, 4 Drawing Figures

3,697,888

INVENTOR
H. G. DANIELMEYER
BY Wilford L. Wisner
ATTORNEY 3,697,888

EVANESCENT WAVE COUPLING TECHNIQUE FOR BEAM SHAPING

BACKGROUND OF THE INVENTION

This invention relates to coherent optical oscillators, such as lasers, parametric oscillators and second-harmonic generators. Moreover, this invention relates to input and output coupling techniques for optical devices, including such oscillators.

Such oscillators employ an appropriate active medium, means for exciting or pumping the active medium to enable the stimulated emission of coherent radiation, and, typically, an optical resonator disposed about the medium to stimulate the emission.

It is widely believed in the coherent optical oscillator art that second-harmonic generation has been achieved at 100 percent efficiency. The efficiency involved is that ratio of the average second harmonic obtained to the average fundamental power that could have been obtained from the pumping laser.

Nevertheless, such full conversion of the available fundamental radiation is not obtained because of the typical Gaussian beam profile. At the center of the beam the fundamental power is highest; and the resultant conversion can be optimized readily in this region. At the edges of the beam, nevertheless, the conversion relationships are then not optimum in the conventional arrangements. Consequently, 100 percent conversion efficiency is not obtained.

SUMMARY OF THE INVENTION

I have found that the input or output coupling has to vary across the cross section of the affected beam in order to attain optimum conversion.

According to a feature of my invention, such coupling is provided by evanescent wave coupling between two surfaces, at least one of which is curved. In general, bicylindrical curvature is provided, for example, by appropriately oriented cylindrical curvatures of the two surfaces.

Alternatively, coupling through at least one spherical surface could be substituted for the bicylindrical coupling with only a modest reduction in performance. Spherical curvature can also be compensated by an appropriate cylindrically-curved element of the coupler.

Advantageously, coupling according to my invention can also provide desirable beam shaping.

BRIEF DESCRIPTION OF THE DRAWING

Further features and advantages of my invention will become apparent from the following detailed description, taken together with the drawing, in which.

DESCRIPTION OF ILLUSTRATIVE EMBODIMENTS

Figure 1:
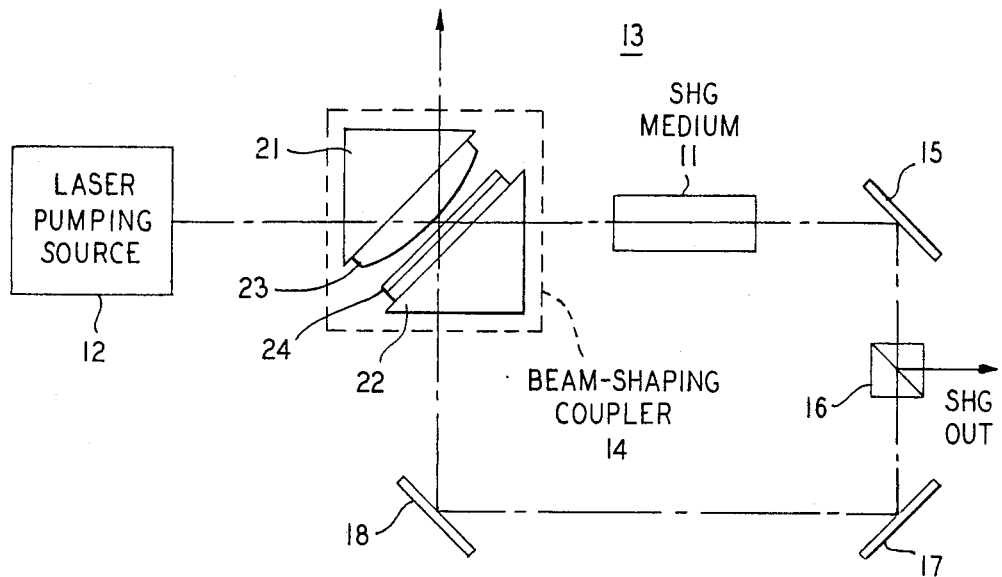
FIG. 1 is a partially pictorial and partially block diagrammatic illustration of a second-harmonic-generation embodiment of my invention.

In FIG. 1, there is shown a coherent optical oscillator apparatus 13 in which a second-harmonic optical beam is generated in response to a coherent fundamental pumping beam from the pumping source 12. The pumping beam is coupled through the beam-shaping coupler and is resonated in a ring resonator including coupler 14, so that the pumping beam makes multiple passes through the second-harmonic generating medium 11. The ring resonator illustratively includes reflectors 15, 17 and 18 in addition to coupler 14, all oriented to form a closed optical path.

A polarization selective prism 16 is included in the resonator between reflectors 16 and 17 and provides means for directing at least a portion, preferably all, of the second harmonic out of the ring resonator. To this end, prism 16 is a compound prism providing reflection of the second-harmonic polarization at the interface of its parts. This technique is preferred for the typical case in which the fundamental and second harmonic are orthogonally polarized. The separation of the beams could also be provided by a dichroic element, for example, by making reflector 15 reflective only at frequencies around the pump frequency and making it transmissive for the second-harmonic frequency.

The beam-shaping coupler 14 includes transparent prism 21 having either anti-reflection-coated orthogonal surfaces forming first and second ports of coupler 14 or surfaces tilted at Brewster's angle and having the transparent, cylindrically-curved member 23 supported on the third surface. Coupler 14 also includes transparent prism 22 having either anti-reflection-coated orthogonal surfaces forming third and fourth ports of coupler 14 or surfaces tilted at Brewster's angle and having a transparent cylindrically-curved member 24 supported on its third surface. We shall assume the ports are numbered in clockwise fashion, starting with the input port for radiation from source 12. The axis of the cylindrical curvature of member 23 is perpendicular to the plane of incidence (plane of FIG. 1) of the input pumping radiation. The axis of curvature of member 24 lies in the plane of incidence of the pumping radiation. The plane of incidence of the pumping radiation is defined by its direction of propagation and the normal to the first refractive interface (e.g., the curved surface of member 23) at which it suffers oblique incidence. The pumping beam from source 12 is directed to be centered at incidence on the curved surface of member 23 at the point at which the common normal to the curved surfaces of members 23 and 24 meets the former surface. The common normal traverses the minimum separation between the two surfaces. With the foregoing relative orientations of the surfaces, the gap between members 23 and 24 is said to be bicylindrically curved. It should be understood that equivalent structures include those in which one of members 23 and 24 is bicylindrically curved and the other is flat, those in which one is spherically curved and the other cylindrically, and those in which both members 23 and 24 are bicylindrically curved, yielding a resultant bicylindrical curvature of the gap.

Figure 2A:
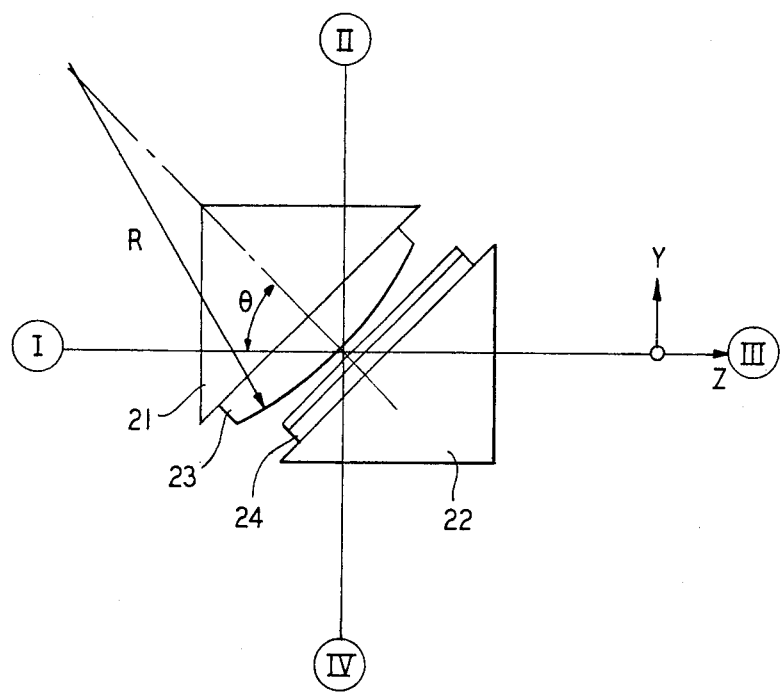
FIGS. 2A and 2B depict further details of the coupler of FIG. 1.
Figure 2B:
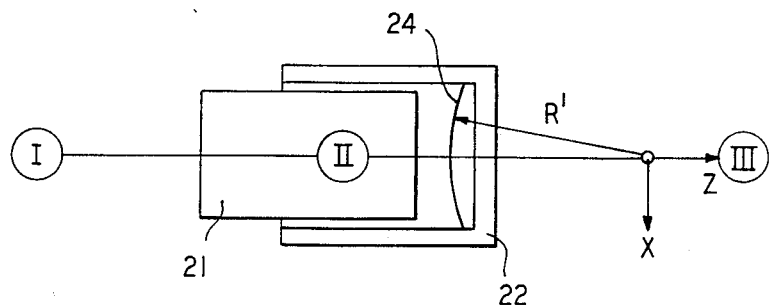

One form of coupler 14 is shown in the elevation and plan views of FIGS. 2A and 2B, respectively. This coupler 14 differs from that of FIG. 1 only in a relative offset of members 23 and 24 to give the maximum usable surface areas of both when either ports labeled "I" and "III" are used as input ports. An appreciation of the relative curvatures of members 23 and 24 obtained from FIGS. 2A and 2B is also applicable to FIG. 1.

The operation of the embodiment of FIG. 1 may be explained as follows. A Gaussian beam has a transverse variation of intensity of the following form:

$$P_\omega = P_{\omega\max} e^{-r^2/2w^2} \qquad (1)$$

where $P_\omega$ is the intensity at a particular point in a cross section at a radial distance $r$ from the beam center, $w$ is the effective beam radius in that cross section, $P_{\omega\max}$ is the intensity at the beam center, and $e$ is the base of the natural logarithms.

For optimum operation, the transmission T of the beam-splitting coupler 14 must satisfy the following equation:

$$T = \sqrt{\gamma P_{\omega\max}} \cdot e^{-r^2/2w^2} \qquad (2)$$

where $\gamma$ is a second-harmonic conversion coefficient defined by the Equation (3):

$$P_{2\omega} = \gamma P^2_\omega. \qquad (3)$$

Proper phase relationships for optimum operation are attained when the pathlength in the oscillator is equal to $M(\lambda/2)$, where $\lambda$ is the optical wavelength associated with the pump frequency $\omega$ and M is an integer. In actual operation, the latter condition would be provided empirically, that is, by experimental adjustment of the pathlength until maximum second-harmonic output is obtained.

In the case of a parametric oscillator or a second-harmonic oscillator in which the oscillator 13 contains an electro-optic crystal (barium sodium niobate, lithium niobate, lithium iodate, KDP, et cetera), tuning into resonance of the cavity for the pump can be achieved electro-optically by applying a certain voltage to the crystal, which alters its optical pathlength for the pump.

It is also possible, by detecting the small residual pump output at port II, and slightly modulating the voltage, to get an error signal which then can be used to keep the resonance condition $M(\lambda/2)$ for the pump automatically.

At this condition of optimum operation, the net reflection of the pump wave at coupler 14 is minimized, so that little power is transmitted out of port II (FIG. 2A), or in the direction indicated as upward in the plane of the paper in FIG. 1. This net reflection is minimized because the resonated pump wave in ring 13 builds up to a level so that the portion transmitted from port IV toward port II destructively interferes with that portion introduced at port I and reflected toward port II.

It should be noted that, if a Gaussian fundamental beam is introduced at port I, a Gaussian fundamental beam exists at all points in the fundamental beam path, and the second-harmonic beam will also be a Gaussian beam.

If, nevertheless, we assume an input beam other than a Gaussian beam, the beam-shaping properties of my invention will be observed. For example, let us assume that the input beam at port I (the ports are assumed to be numbered clockwise, as in FIG. 2A) has a wavefront which is a plane wave. Such a wavefront can be achieved approximately, in practice.

My analysis shows that a Gaussian beam will be obtained at port III. There will be obtained at port II a beam having a lateral variation of intensity that is determined by the difference of intensities of the plane wave beam and the Gaussian beam at corresponding points in their cross sections. The beam transmitted from port II will be dimmest at its center.

The foregoing results are obtained because evanescent wave coupling varies as $\exp(-ag/\lambda)$ where: $a$ is a constant dependent on the refractive indices of the materials and the angle of incidence $\theta$ which must be larger than the angle of total internal reflection; $g$ is the gap between the two members 23 and 24; $\lambda$ is the wavelength of the light. The gap, however, varies with distance $y$ from axis of propagation $z$ as $g = y^2/2R \cos^2 \theta$, where R is the radius of curvature of member 23 in the plane of incidence (drawing plane of FIG. 1A). Therefore, the transmission through the device varies as $\exp(-ay^2/2\lambda R \cos^2 \theta)$ which is Gaussian with a $(1/e^2)$-width of $w = 2 \cos \theta \sqrt{R\lambda/a}$ for the intensity. Example: For $\theta = 45°$ (FIG. 1A), $a = 4\pi \sqrt{(n^2/2)-1}$; for $n = 1.45$ (quartzglass), $\lambda = 1.06$ microns, and $R = 1.4$m, $w = 1$ mm. It is a practically important feature of the device that fairly narrow beam-widths $w$ can be obtained with large radii of curvature R so that focusing is not a problem.

Perpendicular to the plane of incidence, FIG. 2B, it follows that the beamwidth would be $w' = 2 \sqrt{R'\lambda/a}$, where $R'$ is the radius of curvature of member 24 perpendicular to the plane of incidence. The main difference between $w$ and $w'$ is the effect of the non-zero angle of incidence, $\theta$, required for evanescent wave coupling. It is clear that if we want $w' = w$, we must make $R' = R \cos^2 \theta$. Then members 23 and 24 are cylindrical lenses with radii of curvatures R and R', respectively. It can be shown for this case that the profile of the pump beam at port III is centrosymmetrical, having the same width in any direction perpendicular to $z$. Alternatively, the same result can be obtained if member 23 is a spherical lens with radius R and member 24 is a cylindrical lens with radius $R' = R \cos^2 \theta/(1 - \cos^2 \theta)$, or vice versa. Alternatively, member 23 can have the radii of curvatures R and R' in which case member 24 is not needed. If member 23 is spherical, one would obtain an elliptical beam at port III with a waist $w = 2 \cos \theta \sqrt{R\lambda/a}$ in the plane of FIG. 1A and a waist $w = 2 \sqrt{R\lambda/a}$ in the plane of FIG. 1B as minima and maxima, respectively. Alternatively, this could be corrected by cylindrical lenses in port I or port III.

In any of these alternatives, the maximum of the intensity in port III, FIG. 2B, is given by the gap at the beam center, i.e., the point of closest approach of member 23 and member 24. If the lenses nearly touch, the maximum intensity of port III nearly equals the intensity of port I, FIG. 2A, and the minimum intensity of port II, FIG. 2C, is close to zero.

It is characteristic of the embodiment of FIG. 1 that, since the pumping beam within the ring resonator 13 preferably has a Gaussian profile, the transmission T of coupler 14 should have a Gaussian profile in all cases. This result is exactly what the coupler 14 in FIG. 1 provides. In the center of the beam where the intensity and, consequently, the second-harmonic conversion efficiency is high, the transmission is high. The proper Gaussian profile of the transmission can be matched exactly by adjusting the minimum gap between elements 23 and 24 and by appropriately selecting their radii of curvature. For example, their radii of curvature would typically be unequal to compensate for the coma due to any given angle of non-normal incidence of the pumping beam at the curved surface of element 23.

It should be apparent that the coupling technique according to my invention is equally applicable to output coupling, as well as to input coupling. Its use for output coupling from a coherent optical oscillator is illustrated in FIG. 3.

Figure 3:
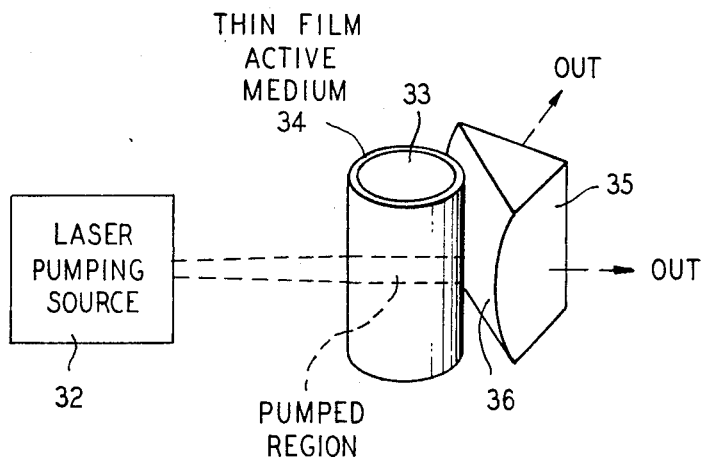
FIG. 3 is a partially pictorial and partially block diagrammatic illustration of a thin-film laser embodiment of my invention.

The embodiment of FIG. 3 is disclosed in a basic form in the copending patent application of R. Ulrich and H. P. Weber, Ser. No. 131,296, filed Apr. 5, 1971, and assigned to the assignee hereof. Their dye ring laser made incidental use of my invention. The embodiment of FIG. 3 can be more specifically described, with emphasis on the aspects relevant to my invention, as follows. A thin-film active medium is coated upon the lateral surface of a transparent substrate cylinder 33, which is pumped by the laser pumping source 32 in a narrow axial band of the medium 34. The pumping beam is sufficiently broad to pump every portion of the circumference of the cylindrical band of thin-film active medium 34, so that excited active medium is present in every portion of a ring-like positive feedback path around the axis of cylinder 33. For this purpose, the pumping beam from source 32 would either be provided with a rectangular cross section, or would be focused with cylindrical lenses to have such a cross section.

The index of the thin-film active medium 34 is selected to be higher than that of the cylinder 33. For example, the active medium 34 could be a laser quality glass doped with neodymium ions and coated uniformly on the lateral surface of a cylinder 33 of poly(methyl methacrylate). Since the thin film 34 is a waveguide for the laser radiation, output radiation is not readily available in the absence of any other component of the apparatus.

According to my invention, the output coupling prism 35 is disposed within evanescent wave coupling distance of the medium 34 in the pumped region and, furthermore, provides a gap of cylindrically-varying thickness.

The cylindrical curvature of the medium 34 itself insures a Gaussian profile of the horizontal cross section of the two output laser beams, one for each direction of traveling wave oscillation in the pumped region. The cylindrical curvature of surface 36 of prism 35, the axis of which is orthogonal to the axis of cylinder 33, insures a Gaussian profile of the cross sections of the two output beams in respective vertical planes of their cross sections. Note that in this embodiment, there is no oblique incidence of the pump beam center at a curved surface, but the plane of the ring-like pumped medium defines the plane of incidence. Prism 35 can be moved about cylinder 33 so long as the axis of curved surface 36 is kept in the plane thus defined.

It is also noteworthy with respect to the embodiment of FIG. 3 that its application is equally advantageous for an optical parametric oscillator for the case in which one of the output wavelengths of the parametric oscillator is larger than the pumped wavelength. In fact, this is a typical case for a parametric oscillator. It should be noted that for devices of the type shown in FIG. 3, the effective transmission of the coupler for high efficiency is proportional to exponential exp $(-ag/\lambda a^{2/3})$, where $a$ is defined above and $g$ is the gap thickness, as before. The coupler then can be used effectively to couple out the larger wavelength in addition to its function of providing pump coupling.

While both of the preceding embodiments have illustratively shown bicylindrical relative curvature of two bodies for optimum operation of a coupler according to my invention, it should be apparent that in any more general types of thin film optical devices are possible and that bicylindrical curvature may not be necessary to effective operation. In fact, even in the laser of FIG. 3, the cylindrical curvatures of the members 34 and 35 are not equal because the lossy active medium 34 outside of the pumped region already exerts an effect tending to compel a Gaussian profile of the output beams in the vertical planes of their cross sections.

Therefore, prism 35 can have a larger radius of curvature of its surface 36 than would otherwise be needed.

As a further example, imagine that in FIG. 1A the components shown of coupler 14 are thin films having a substantially uniform thickness normal to the plane of the paper. Then the intensity in the film would be correspondingly constant in the plane of the paper; and an approximately Gaussian variation of intensity would inherently exist in a direction normal to the plane of the paper. In that case, the curvature of member 23 is sufficient to provide a Gaussian profile of the beam at output port III.

Alternatively, the film could be curved, whether or not in a closed loop or ring about a first axis, as in the embodiment of FIG. 3. The curvature then necessary about an axis normal to the first axis is only that necessary to compensate for such curvature and match the profiles of the coupled beam in two coordinates.

It should also be apparent that my invention has beam shaping applications even when no active medium or nonlinear optical medium is present in the apparatus. To this end, the curvatures of the coupling elements need not be cylindrical or spherical and can be selected to provide the effective lateral variation of transmission, according to the above principles, that provides the desired output beam shape.

I claim:

1. An apparatus of the type comprising at least one active medium in which the emission of coherent radiation can be stimulated, means for coupling energy into said medium to enable said stimulated emission, means for stimulating said emission, and means for coupling said radiation from said medium for utilization, said apparatus being characterized in that one of said coupling means comprises at least one body spaced within evanescent wave coupling distance from another component of said apparatus, said one body having a curved surface forming a variable-thickness gap with respect to said other component.

2. Apparatus according to claim 1 in which the body is cylindrically curved in at least one coordinate.

3. Apparatus according to claim 2 in which the body is cylindrically curved to vary the thickness of the gap bicylindrically and thereby to facilitate the stimulated emission of coherent radiation.

4. Apparatus according to claim 2 in which the body is cylindrically curved to vary the thickness of the gap bicylindrically and thereby provide a selected Gaussian shape of the beam transmitted through the coupling means.

5. Apparatus according to claim 1 in which the active medium is a nonlinear optical medium and the stimulating means comprises means for forming a ring-type optical resonator in cooperation with said means for coupling energy into said medium and said means for coupling radiation from said medium, said one coupling means comprising a four-port coupling arrangement including two members forming a bicylindrically curved gap therebetween.

6. Apparatus according to claim 5 in which said one coupling means is the means for coupling energy into the medium.

7. An apparatus of the type comprising means for altering input optical radiation, means for coupling said input radiation into said altering means, and means for coupling radiation from said altering means for utilization, said apparatus being characterized in that one of said coupling means comprises means having a curved surface for forming a gap of laterally varying transmission in the path of radiation transmitted therethrough to provide selected beam shaping.

8. Apparatus according to claim 7 in which the curved surface provides a selected bicylindrical curvature of the gap to insure a transmitted beam of Gaussian cross section.

* * * * *